H. J. KIMMAN.
CONNECTING ROD FOR PISTONS.
APPLICATION FILED DEC. 11, 1914. RENEWED FEB. 25, 1916.
1,179,110.                                      Patented Apr. 11, 1916.
Fig. 1.                   Fig. 2.
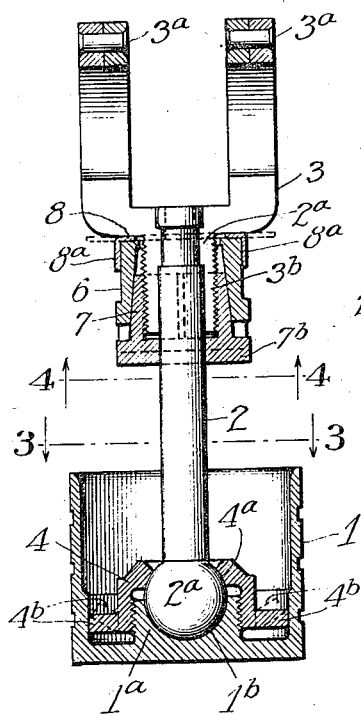
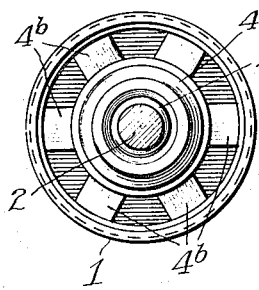
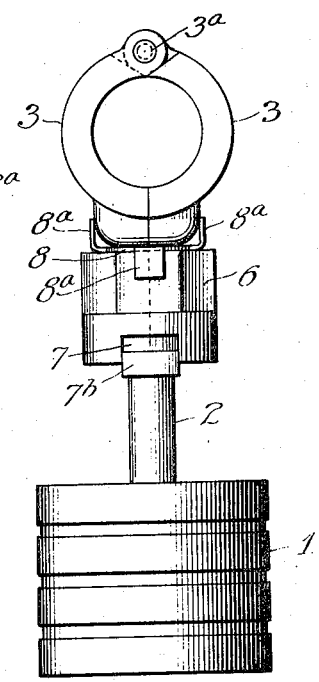
Fig. 3.
Fig. 4.                Fig. 8.
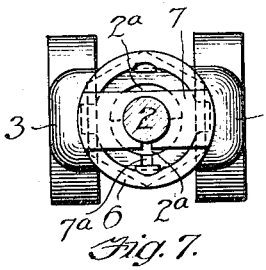
Fig. 5.     Fig. 7.     Fig. 6.
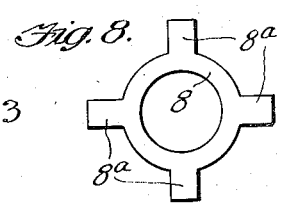
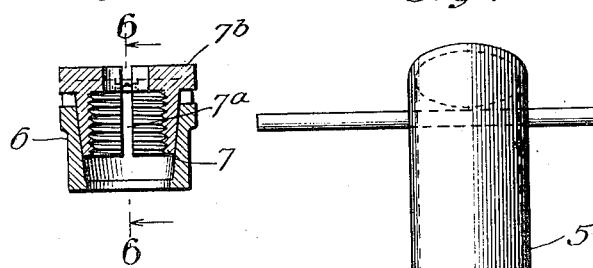
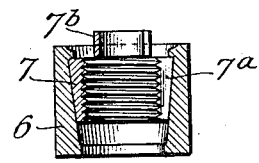
Witnesses
Martin H. Olsen.
Robert Dobberman
Inventor
Henry J. Kimman
By Rector, Hibben, Davis & Macauley
his Attys

UNITED STATES PATENT OFFICE.

HENRY J. KIMMAN, OF CLEVELAND, OHIO, ASSIGNOR TO CHICAGO PNEUMATIC TOOL COMPANY, OF CHICAGO, ILLINOIS, A CORPORATION OF NEW JERSEY.

CONNECTING-ROD FOR PISTONS.

1,179,110.     Specification of Letters Patent.     Patented Apr. 11, 1916.

Application filed December 11, 1914, Serial No. 876,606. Renewed February 25, 1916. Serial No. 80,541.

*To all whom it may concern:*

Be it known that I, HENRY J. KIMMAN, a citizen of the United States, residing at Cleveland, in the county of Cuyahoga and State of Ohio, have invented certain new and useful Improvements in Connecting-Rods for Pistons, of which the following is a specification.

My invention relates to connecting rods or pitmen for pistons, etc., and one of the objects thereof is to form a simple and efficient means for connecting the outer end of the rod with the piston so that in case of breakage of either part the same may be detached and a new part substituted.

In the drawing, Figure 1 is a central longitudinal section of a piston and connecting rod including its crank bearing embodying my invention; Fig. 2 an elevation thereof; Fig. 3 a sectional plan on the line 3—3 of Fig. 1; Fig. 4 a sectional plan on the line 4—4 of Fig. 1; Fig. 5 a detail section of the locking device for locking the rod to its bearing; Fig. 6 a section on the line 6—6 of Fig. 5; Fig. 7 a perspective of the tool or wrench utilized in the operation of removing or detaching the rod from the piston; and Fig. 8 a detail view of the locking washer.

Referring to the particular embodiment of my invention as herein shown the piston 1 is provided with a connecting rod or pitman 2 connected at its outer end with the inner portion of the head of the piston and at its inner end with the bearing 3 which coöperates with the crank or wrist pin, not shown.

Referring first to the means whereby the rod is connected to the piston, the piston is formed with a tubular boss $1^a$ which is located within the trunk of the piston and provided with a portion $1^b$ of the socket to receive the ball end $2^a$ of the connecting rod. This boss is externally screw-threaded in order to receive the internally screw-threaded cap 4 having a central bore through which the rod 2 passes and also with a socket $4^a$ which forms a part of the socket for the ball end $2^a$ of such rod, the two socket portions $1^b$ and $4^a$ forming the socket bearing for this ball end $2^a$. As shown in Figs. 1 and 3 this cap is provided with a series of radial projections or wings $4^b$ which, before the cap is screwed upon the boss, occupy the angular position shown in dotted lines in Fig. 1. After the cap has been screwed into place these projections are utilized for the purpose of locking the cap against any possibility of unscrewing. To this end these projections are forced downwardly to or toward the horizontal position as shown in dotted lines in Fig. 1. When in this position these projections hold the cap with considerable frictional resistance, so that in the operation of the piston it is impossible for these parts to loosen up. When it is desired to remove the cap in case of breakage of the connecting rod, for instance, the piston is put into a suitable vise for holding it and a suitable tool such as the wrench 5 illustrated in Fig. 7 is employed for engaging the cap and unscrewing the same from the boss. This wrench is provided at its outer end with a series of projections $5^a$ which enter between the projections $4^b$ and permit said engagement. The frictional resistance caused by the projections $4^b$ is not of course such as to prevent unscrewing of the cap when positive force is applied by means of this wrench. When the cap 4 is removed the old connecting rod can be removed and a new one inserted and the new cap 4 or the old cap, after its projections $4^b$ have been bent back to said angular position, is then used for securing the new connecting rod in place.

Referring to the locking means between the other end of the connecting rod 2 and its bearing 3, this bearing is made in two parts which are pivoted at $3^a$. Their inner ends when brought together form two members of a tubular sleeve $3^b$, which is provided externally with a straight thread. This sleeve is provided internally with a bore corresponding to the shape of the connecting rod 2 which is cylindrical and of uniform diameter except near its inner end where it has a reduced portion $2^a$. The securing and locking device consists of a two-part nut. The outer part of this nut is in the form of a sleeve 6 having an angular exterior to receive a wrench or the like and a smooth bore to receive a second sleeve 7 which is split at $7^a$ and also internally screw-threaded, as seen in Fig. 5. At its upper end this inner sleeve is formed with a transverse block $7^b$ having a central bore through which the rod 2 passes and is received within a transverse slot in the outer end of the sleeve 6. The purpose of this latter arrangement is to prevent circumferential movement of the two sleeves 6 and 7 relative to each other but to permit longitudinal movement of the inner sleeve with respect to the outer. When the outer sleeve or nut is turned the inner sleeve is rotated therewith and at the same time moves longitudinally thereof during which time such inner sleeve 7 is contracted by reason of the tapering inner walls of the outer sleeve with the result that it becomes securely clamped upon the screw-threads of the sleeve $3^b$ of the connecting rod bearing. In this manner the members of the bearing are clamped and held tightly upon the connecting rod and prevented from loosening. As a matter of precaution I also employ the locking washer shown in Fig. 8, the same comprising a washer proper marked 8 having four radial projections $8^a$, two opposite ones of which are adapted to be bent downwardly to engage the bearing members 3 and the other two outwardly to engage the nut or outer sleeve 6.

I claim:

1. The combination of a piston having on its inner side a screw-threaded boss provided with a socket, a cap screwing onto said boss and having means for engaging the inner walls of the piston, and a connecting rod having a ball end received by said socket.

2. The combination of a piston having on its inner side a screw-threaded boss provided with a socket, a cap screwing onto said boss and having a series of marginal projections adapted to be forced against the inner walls of the piston to hold the cap from unscrewing, and a connecting rod having a ball end received by said socket.

3. The combination of a piston having on its inner side a screw-threaded boss provided with a socket, a cap screwing onto said boss and having an internal socket, said cap being provided with a series of radial projections $4^b$ originally at an oblique angle to the cap but adapted to be forced toward right angles thereto and against the inner walls of the piston to hold the cap from unscrewing, and a connecting rod having a ball end received by said socket.

HENRY J. KIMMAN.

Witnesses:
 JENNIE W. LALIME,
 A. HAFFNER.